United States Patent

Yoshita

[11] Patent Number: 5,725,339
[45] Date of Patent: Mar. 10, 1998

[54] CRANKSHAFT WORKING METHOD

[75] Inventor: Hirokazu Yoshita, Ishikawa-ken, Japan

[73] Assignee: Kabushiki Kaisha Komatsu Seisakusho, Tokyo, Japan

[21] Appl. No.: 525,549

[22] PCT Filed: Mar. 31, 1994

[86] PCT No.: PCT/JP94/00540

§ 371 Date: Sep. 19, 1995

§ 102(e) Date: Sep. 19, 1995

[87] PCT Pub. No.: WO94/22625

PCT Pub. Date: Oct. 13, 1994

[30] Foreign Application Priority Data

Mar. 31, 1993 [JP] Japan ................. 5-073453

[51] Int. Cl.⁶ ............................................. B23C 3/06
[52] U.S. Cl. ........................ 409/132; 82/106; 409/199
[58] Field of Search ......................... 409/132, 131, 409/199, 200; 82/106, 1.11

[56] References Cited

U.S. PATENT DOCUMENTS 4,269,551  5/1981  Kialowetz ................. 409/199
4,309,134  1/1982  Schmid ..................... 409/199
4,790,698  12/1988  Heffron ..................... 409/200

FOREIGN PATENT DOCUMENTS 55-32482   8/1980   Japan .
66610      4/1983   Japan ..................... 409/132
62-50246   10/1987  Japan .
3-149139   6/1991   Japan .

*Primary Examiner*—Daniel W. Howell
*Attorney, Agent, or Firm*—Wenderoth, Lind & Ponack

[57] ABSTRACT

There is provided a method of working a crankshaft wherein a first cutter for simultaneously working an outer peripheral surface of a pin or journal of the crankshaft and a side surface of a counter weight disposed adjacent to the outer peripheral surface is mounted to one of two cutter heads of a crankshaft mill. A second cutter is provided for forming an R groove on the pin or journal. The second cutter is mounted to the other one of the cutter heads. The outer peripheral surfaces of the pin or the journal and the side surface of the counter weight adjacent to the outer peripheral surface are simultaneously worked by the first cutter, and thereafter, the R groove is formed on the pin or the journal by the second cutter.

8 Claims, 2 Drawing Sheets

CRANKSHAFT WORKING METHOD

BACKGROUND OF THE INVENTION

The present invention relates to a method of machining a crankshaft which is utilized for an engine or the like.

In the prior art, outer peripheral surfaces of a pin, a journal, and a side surface of a counter weight of a crankshaft of the above kind are worked by means of a crankshaft mill. However, both end portions of the pin and the journal are worked by means of another machine because these end portions are formed with R grooves which are subjected to undercut working.

The use of another machine for forming the R-grooves involves increased equipment costs and includes additional steps for changing a setup at a time of attaching and detaching the work. The prior art arrangement is therefore inconvenient and results in reduced productivity.

In order to overcome the defects associated with the prior art, a machining method has been proposed which is capable of simultaneously working the outer peripheral surfaces and the R grooves of the pin and the journal. The method includes mounting, to the same cutter, a tip for working the outer peripheral surfaces and a tip for working the R grooves. The above arrangement is based on an assumption that the side surface of the counter weight is not worked or shaped such as in a case where high-speed revolution of the crankshaft is not required.

However, in a case involving high-speed revolution of the crankshaft and thus requiring working of the side surface of the counterweight, the side surface of the counter weight will be worked by the same tip as that utilized for the working of the R groove. As a result, the tip for forming the R groove is subject to greater wear, resulting in degradation of the working performance of the crankshaft.

SUMMARY OF THE INVENTION

An object of the present invention is to avoid the inconveniences described above, and to provide a method of machining a crankshaft capable of effectively working both the outer peripheral surfaces and the R grooves of a pin and a journal by using a single working machine.

In order to achieve the above object, according to the present invention, there is provided a method of machining or working a crankshaft which includes a first cutter for simultaneously working an outer peripheral surface of a pin or journal of the crankshaft and a side surface of a counter weight disposed adjacent to the outer peripheral surface of the pin or journal. The cutter is mounted to one of two cutter heads of a crankshaft mill. A second cutter is provided for forming an R groove on the pin or the journal. The second cutter is mounted to another one of the cutter heads. The outer peripheral surface of the pin or the journal and the side surface of the counter weight adjacent to the outer peripheral surface are simultaneously worked by the first cutter, and thereafter, the R groove is formed on the pin or the journal by the second cutter.

According to the working method, the outer peripheral surfaces of the pin and journal of the crankshaft, the side surface of the counter weight, and the R grooves of the pin and the journal can be worked by a single working machine, so that changes of the machine setup are not required, thus improving the productivity of the process of machining the crankshaft. In addition, the outer peripheral surface of the pin or the journal is worked by a cutter which is different from the cutter for working the R groove, so that the wear of the cutter for the R groove working is reduced, thus improving the R groove working precision.

Preferably, in a case where the crankshaft is provided with a plurality of pins and journals, the outer peripheral surfaces of the plurality of pins or journals and the side surfaces of the counter weights disposed adjacent to the outer peripheral surfaces can be worked respectively simultaneously and then successively, and the R groove working is performed on the pins and journals, of which the outer peripheral surfaces have been worked, successively.

Furthermore, preferably, the outer peripheral surface of one of the pin and the journal and the side surface of the counter weight adjacent to that outer peripheral surface are worked together with the R groove working, and thereafter, the outer peripheral surface of the other one of the pin and journal and the side surface of the counter weight adjacent to this outer peripheral surface are worked together with the R groove working.

Still preferably, the cutter head having the first cutter is provided with a rest, the rest supporting the journal at the time when the first cutter works the outer peripheral surface of the pin and the side surface of the counter weight adjacent to the outer peripheral surface of the pin, and the rest also supporting the pin at the time when the first cutter works the outer peripheral surface of the journal and the side surface of the counter weight adjacent to the outer peripheral surface of the journal.

BRIEF DESCRIPTION OF THE DRAWINGS

The present invention will be made more understandable from the following detailed description and the accompanying drawings, which show an embodiment of the present invention. Further, the embodiment shown in the accompanying drawings is not intended to limit the invention, but rather to facilitate the explanation and understanding of the invention.

In the accompanying drawings.

DETAILED DESCRIPTION OF THE INVENTION

A method of working or machining a crankshaft according to a preferred embodiment of the present invention will now be described with reference to the accompanying drawings.

Figure 1:
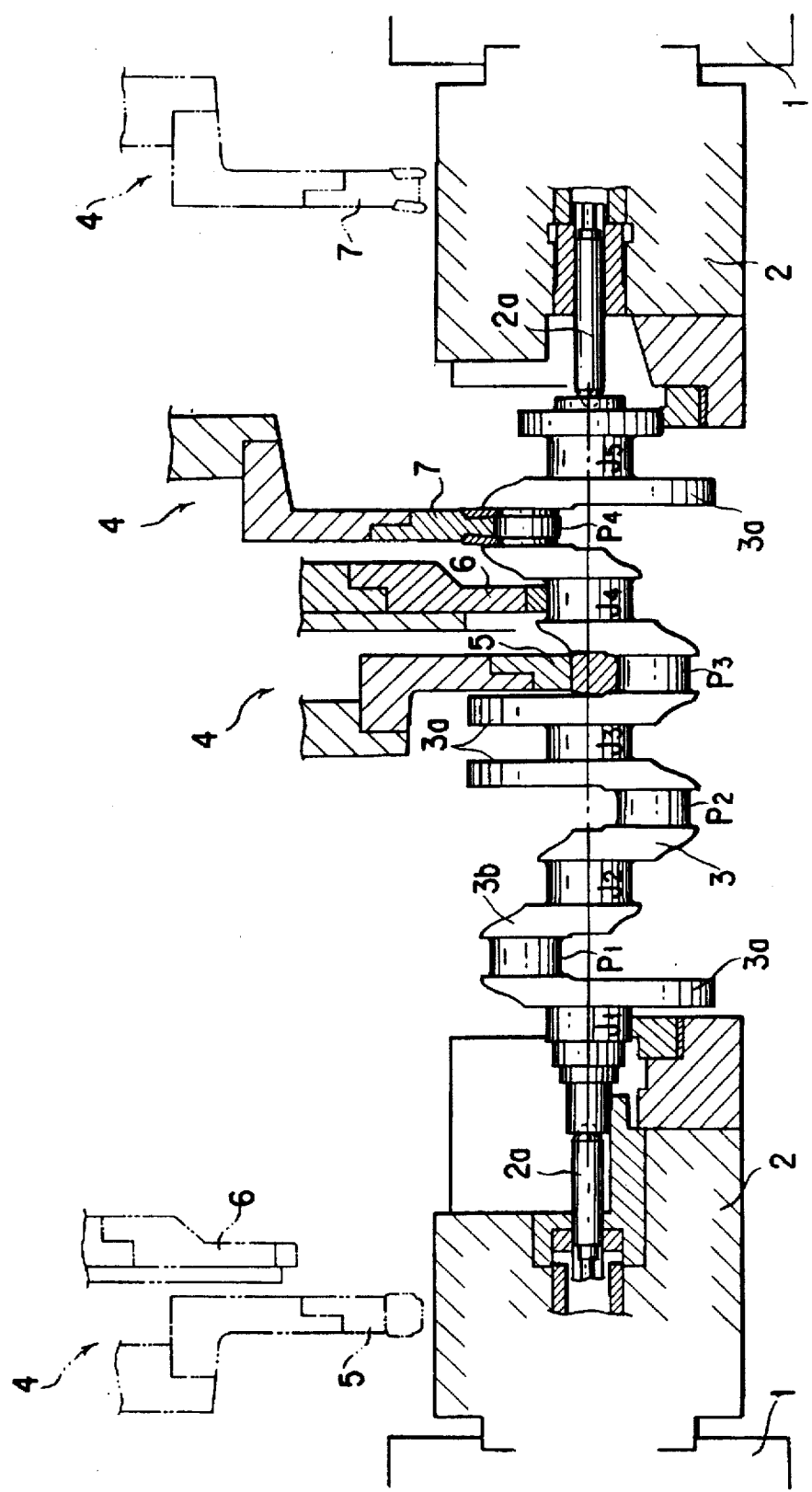
FIG. 1 is a view showing an arrangement of a crankshaft mill utilized for a method of working a crankshaft according to one embodiment of the present invention.

FIG. 1 represents an arrangement of an apparatus for working a crankshaft used for a four-cylinder engine by means of a crankshaft mill. In FIG. 1, reference numeral 1 denotes two work heads, and reference numeral 2 denotes chucks disposed to opposing surfaces of the work heads 1. The chucks 2 are adapted to support a work (crankshaft) 3 to be worked at both ends thereof in a state centered by a centering device 2a, to phase-index a working position of the work and, then, to clamp both the ends of the work by claw means, not shown.

Reference numeral 4 denotes two cutter heads which are movable in an axial direction of the work 3 and in a direction normal to the work 3 and to one of the cutter heads 4. There is provided an annular cutter 5 for simultaneously working the outer peripheral surfaces of pins P1–P4 of the work 3 and side surfaces of counter weights 3a and a rest 6 for supporting journals J1–J5 disposed adjacent to a working portion. On the other one of the cutter heads 4 there is provided an annular cutter 7 for working an R groove 3b.

Next, a crankshaft working or machining method will be described.

Figure 2:
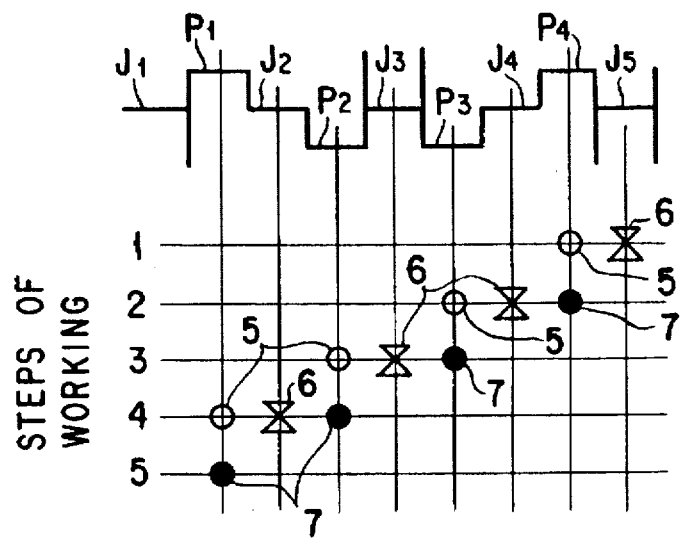
FIG. 2 is a view showing steps for working an outer peripheral surface of a pin by the embodiment illustrated in FIG. 1.

In the first step, after a working position of the work 3 is phase-indexed and both the ends of the work 3 are clamped by the chucks 2, the cutter 5 is moved to the position of the pin P4 as shown in FIG. 2, and then, the journal J5 is supported by the rest 6.

In the next step, under the condition mentioned above, the outer peripheral surface of the pin P4 and the side surface of the counter weight 3a adjacent thereto are worked. Upon the completion of this step, the cutter 5 is moved to the position at which the pin P3 is worked, and the R groove working cutter 7 which is waiting for cutting is moved to the position of the pin P4 which has been worked by the cutter 5. In this manner, the outer peripheral surface of the pin P3, the side surface of the counter weight 3a adjacent thereto and the R groove 3b of the pin P4 are simultaneously worked.

In the succeeding steps, the outer peripheral surfaces of the other pins P2 and P1, the side surfaces of the other counter weights 3a and the R grooves of the pins P3, P2 and P1 are worked in the same manner in accordance with the working steps shown in FIG. 2.

In accordance with the manner described above, the outer peripheral surfaces of the pins P1–P4, the side surfaces of the counter weights 3a and the R grooves can be worked by one working machine.

Figure 3:
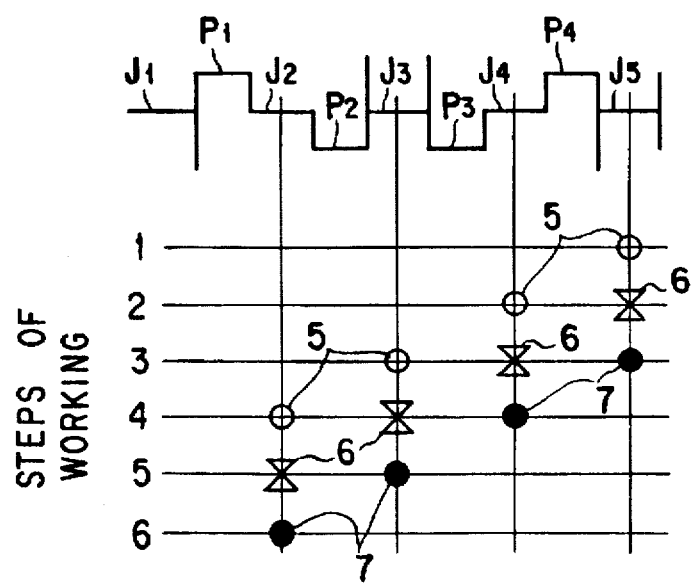
FIG. 3 is a view showing steps for working an outer peripheral surface of a journal by the embodiment illustrated in FIG. 1.

Further, in the above, there is described a case where the outer peripheral surfaces of the pins P1–P4 are worked, but as shown in FIG. 3, the outer peripheral surfaces of the journals J2–J5, the side surfaces of the counter weights 3a and the R grooves of the journals can be also worked in substantially the same manner. Furthermore, in a situation where a small diameter portion of the crankshaft on the side of the journal J1 is clamped, the outer peripheral surface of the journal J1, the side surface of the counter weight 3a adjacent thereto and the R groove can also be worked in substantially the same manner.

Although the embodiment described above is a case applicable to the working of the crankshaft to be used for a four cylinder engine, the working method may be applicable to other cases where crankshafts to be used for engines of other than four-cylinder structures are manufactured.

As described hereinabove, according to the crankshaft working method, the first cutter for working simultaneously the outer peripheral surfaces of the pins or journals of the crankshaft and the side surfaces of the counter weight adjacent to the pins or journals is mounted to one of two cutter heads of the crankshaft miller. The second cutter, for working the R grooves to the pins or journals, is mounted to the other one of two cutter heads. After the outer peripheral surfaces of the pins or journals and the side surfaces of the counter weights adjacent to the pins or journals have been simultaneously worked by the first cutter, the R grooves are formed on the pins or journals by the second cutter. As a result, the outer peripheral surfaces and R grooves of the pins and journals and can be worked by the single working machine. Accordingly, in comparison with a case where the above workings are performed by separate machines, the equipment cost and the space required for accommodating the machine can be reduced, and in addition, the setup changing time can be reduced, thus improving the productivity of the crankshaft manufacturing process.

Furthermore, in comparison with a case where a tip for working the outer peripheral surface of a pin or journal and a tip for working an R groove are mounted in one cutter, the tip for working the R groove is less worn, and thus the working precision of the R groove can be improved.

Further, it will be apparent to those skilled in the art that although the present invention is described with reference to the exemplary embodiment, many other changes, deletions and additions to the disclosed embodiment may be made without departing from the subject and scope of the present invention. Accordingly, it is to be understood that the present invention is not limited to the described embodiment and involves a scope which is limited only by the appended claims.

I claim:

1. A method of machining a crankshaft, said method comprising:

working an outer peripheral surface of one of a first pin and a first journal of a crankshaft with a first cutter which is mounted to one of two cutter heads of a crankshaft mill, and working a side surface of a first counterweight disposed adjacent to said outer peripheral surface of said one of said first pin and said first journal with said first cutter, wherein said working of said outer peripheral surface and said working of said side surface are performed simultaneously; and forming an R groove on one of said first pin and said first journal with a second cutter mounted to the other of said two cutter heads.

2. The method of machining a crankshaft as claimed in claim 1, further comprising:

supporting the other of said first pin and said first journal with a rest structure which is mounted on said one of said two cutter heads while working said one of said first pin and said first journal with said one cutter.

3. The method of machining a crankshaft as claimed in claim 1, further comprising:

working an outer peripheral surface of one of a second pin and a second journal of the crankshaft with said first cutter;

working a side surface of a second counterweight disposed adjacent to said outer peripheral surface of said one of said second pin and said second journal, wherein said working of said outer peripheral surface of said one of said second pin and said second journal is performed simultaneously with said working of said side surface; and supporting the other of said second pin and said second journal with a rest structure mounted on said one of said two cutterheads.

4. A method of machining a crankshaft having a plurality of pins and journals, said method comprising:

1) working, with a first cutter mounted on a first cutter head, an outer peripheral surface of one of a first pin and a first journal of a crankshaft, while simultaneously working a side surface of a first counterweight which is disposed adjacent to said first pin and said first journal; and 2) working, with said first cutter, an outer peripheral surface of one of a second pin and a second journal of the crankshaft while simultaneously working a side surface of a second counterweight which is disposed adjacent to said one of said second pin and said second journal, and forming an R groove on one of said first pin and said first journal with a second cutter mounted on a second cutter head while working said outer peripheral surface of said one of said second pin and said second journal with said first cutter.

5. The method of machining as claimed in claim 4, further comprising:

supporting the other of said first pin and said first journal with a rest structure which is mounted on said first cutter head while working said one of said first pin and said first journal; and supporting the other of said second pin and said second journal with said rest structure while working said one of said second pin and said second journal.

6. The method of machining as claimed in claim 5, further comprising:

working, with said first cutter, an outer peripheral surface of one of a third pin and a third journal of the crankshaft while simultaneously working a side surface of a third counterweight which is disposed adjacent to said one of said third pin and said third journal, and forming an R groove on said one of said second pin and said second journal while working said outer peripheral surface of said one of said third pin and said third journal with said first cutter.

7. The method of machining as claimed in claim 6, further comprising:

supporting the other of said third pin and said third journal with said rest structure while working said one of said third pin and said third journal.

8. The method of machining as claimed in claim 4, further comprising:

working, with said first cutter, an outer peripheral surface of one of a third pin and a third journal of the crankshaft while simultaneously working a side surface of a third counterweight which is disposed adjacent to said one of said third pin and said third journal, and forming an R groove on said one of said second pin and said second journal while working said outer peripheral surface of said one of said third pin and said third journal with said first cutter.

* * * * *